United States Patent

Scheifele

[15] 3,692,374
[45] Sept. 19, 1972

[54] COMPOSITE TAPERED ROLLER BEARING RACE

[72] Inventor: Hudson B. Scheifele, 30165 Ponds View Road, Franklin, Mich. 48025

[22] Filed: June 28, 1971

[21] Appl. No.: 157,375

Related U.S. Application Data

[62] Division of Ser. No. 870,681, Oct. 27, 1969, Pat. No. 3,597,819.

[52] U.S. Cl. ..................................................308/216
[51] Int. Cl. ..............................................F16c 33/58
[58] Field of Search.......................................308/214

[56] References Cited

UNITED STATES PATENTS

| | | | |
|---|---|---|---|
| 2,166,377 | 7/1939 | Scribner | 308/214 |
| 3,229,353 | 1/1966 | Morrison | 29/148.4 R |

Primary Examiner—Edgar W. Geoghegan
Assistant Examiner—Frank Susko
Attorney—Barthel & Bugbee

[57] ABSTRACT

Suitable bearing race material is formed into bar stock having a longitudinally oriented grain structure and having a cross-section corresponding to the cross-section of the prospective bearing race. From the thus-shaped bar stock are cut a plurality of pieces whose combined lengths substantially equal the circumferential length of the prospective bearing race. These pieces are then bent into circularly arcuate segments having curvatures corresponding to that of the prospective bearing race and having ends configured to fit one another. These segments are then aligned end-to-end in an annular path and welded together into an annular body which is then hardened and ground. This bar stock is provided with an inclined side surface which, for an outer race, becomes the inner surface of the segment, and for an inner race becomes the outer surface of the segment, in each instance constituting the roller path.

3 Claims, 8 Drawing Figures

INVENTOR
HUDSON B. SCHEIFELE
BY Barthel & Bugbee
ATTORNEYS 3,692,374

COMPOSITE TAPERED ROLLER BEARING RACE

This is a division of my copending application Ser. No. 870,681 filed Oct. 27, 1969 for Method of Making a Composite Tapered Roller Bearing Race, now U.S. Pat. No. 3,597,819, issued Aug. 10, 1971.

In the drawings:

FIG. 5 is a perspective view of a portion of roller inner race bar stock;

Figure 1:
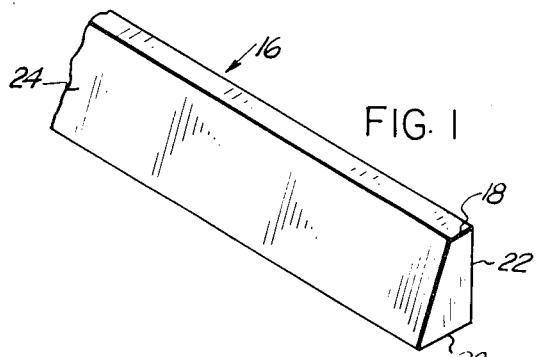
FIG. 1 is a perspective view of a portion of rolled outer race bar stock.
Figure 4:
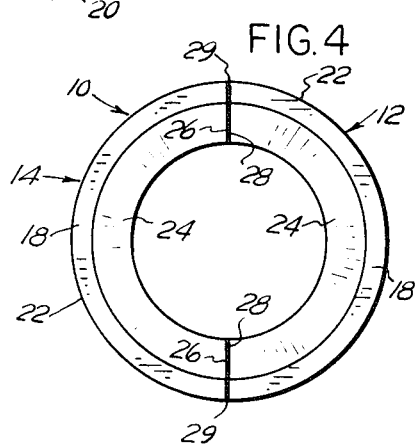
FIG. 4 is a front elevation of a composite outer bearing race formed from a right-hand and a left-hand outer bearing race half butt-welded to one another.

Referring to the drawings in detail, FIG. 4 shows a composite tapered roller bearing outer race, generally designated 10, according to one form of the invention as consisting of a right-hand half 12 and a left-hand half 14, each of semi-annular form and joined to one another in the manner described below. It will be understood that the terms "right-hand" and "left-hand" are purely relative depending upon which side of the race 10 the observer is facing. To produce the composite outer race 10, straight bar stock 16 is shaped in any suitable manner (FIG. 1) such as by rolling suitable bearing material, for example steel, in a conventional rolling mill (not shown) to form parallel faces 18 and 20 perpendicular to a face 22 and disposed at obtuse and acute angles respectively to an inclined face 24.

Figure 2:
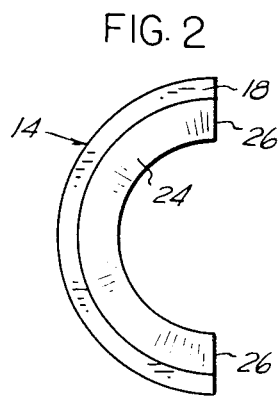
FIG. 2 is a front elevation of an outer bearing race half formed from a portion of the bar stock of FIG. 1.
Figure 3:
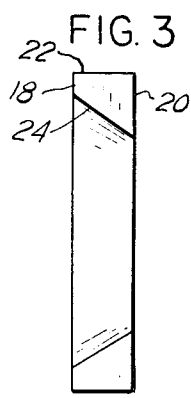
FIG. 3 is a right-hand end elevation of the outer bearing race half shown in FIG. 2.

The bar stock 16 is severed into portions which are equal in length to the circumferential length of a half-annular portion of the eventual bearing race to be made, such as in a suitable bending die, thereby producing the semi-annular left-hand outer bearing race 14 shown in FIGS. 2 and 3. The right-hand outer bearing race half 12 is formed by a similar procedure but by bending the portion of bar stock 16 in the opposite direction. The face 22 thus becomes the outer semi-cylindrical surface of the bearing race half 12 or 14, the inclined surface 24 becomes the roller path surface, and the faces 18 and 20 remain flat and parallel to one another. The opposite end surfaces 26 become co-planar chordal surfaces, namely flat diametral end surfaces.

The right-hand outer bearing race half 12 has similarly disposed surfaces 18, 20, 22 and 24 and similar co-planar chordal surfaces, namely flat diametral end surfaces 28 (FIG. 4). The surface 20 of the right-hand bearing race 12 is not visible in FIG. 4. The outer bearing race halves 12 and 14 are then assembled with their end faces 26 and 28 in abutting engagement with one another and with the two halves 12 and 14 so aligned that their outer and inner surfaces 22 and 24 and their side surfaces 18 and 20 merge smoothly and continuously into one another. This is done by placing them in a suitable aligning fixture (not shown) provided for that purpose. The end faces 26 and 28 are then butt-welded at 29 to one another while in their aligned positions to form the composite outer bearing race 10, which is then hardened by suitable heat treatment and ground to its finished form.

Figure 5:
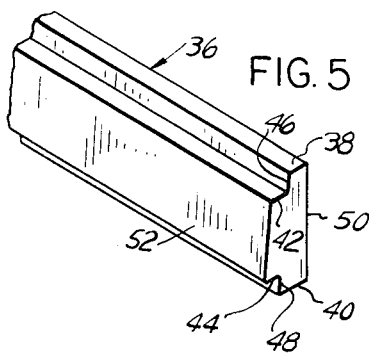
FIG. 5 is a perspective view of a portion of rolled inner race bar stock.
Figure 8:
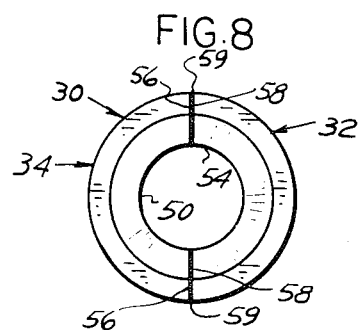
FIG. 8 is a front elevation of a composite inner bearing race made from a right-hand and a left-hand inner bearing race half butt-welded to one another.

Referring now to FIG. 8, there is shown therein a composite tapered roller bearing inner race, generally designated 30, consisting of a right-hand half 32 and a left-hand half 34, each of semi-annular form and joined to one another also in the manner described below. To produce the composite inner race 30, straight bar stock 36 is formed in any suitable manner, such as by rolling suitable bearing material, for example steel, in a conventional rolling mill (not shown) to form parallel faces 38 and 40 (FIG. 5) with parallel shouldered faces 42 and 44 in stepped relationship thereto and joined thereto by perpendicular surfaces 46 and 48 respectively. The surfaces 38 and 40 are formed perpendicular to a base 50 and disposed at obtuse and acute angles respectively to an inclined face 52.

Figure 6:
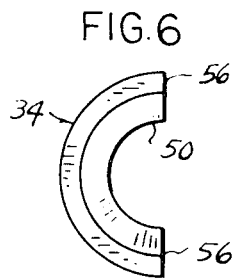
FIG. 6 is a front elevation of an inner bearing race half formed from a portion of the bar stock of FIG. 5.
Figure 7:
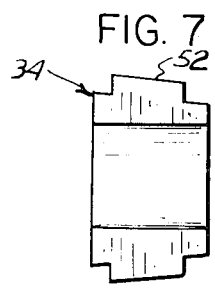
FIG. 7 is a right-hand end elevation of the inner bearing race half shown in FIG. 6.

The left-hand inner race half 34 is formed from the semi-circumferential length of bar stock 36 by bending such a bar stock portion in a suitable bending or forming die to convert it into the semi-annular member shown in FIGS. 6 and 7. Here, the face 50 becomes the semi-cylindrical portion of the shaft bore 54 whereas the inclined face 52 becomes the semi-conical roller path 52. The right-hand inner bearing race half 32 is made in a similar manner but by bending the bar stock portion in the opposite direction. The end faces 56 are disposed in alignment with one another in the left-hand half 34 and the end faces 58 of the right-hand half race 32 are similarly disposed. Both pairs of end faces 56 and 58 are diametral. The right-hand and left-hand inner race halves 32 and 34 are then placed in a suitable aligning fixture which holds them with their various surfaces in aligned positions, whereupon the end faces 56 and 58 are then butt-welded at 59 to one another in their aligned positions. The composite inner race 30 is then hardened by heat treatment and ground to its finished form. The composite outer and inner bearing races 10 and 30 are used in the manner of conventional tapered roller bearing races by placing a full complement of tapered rollers in the annular space between them. The composite races 10 and 30 of the present invention, however, possess the particular advantage that as their grain structure extends longitudinally in the bar stock 16 and 36 from which they were formed, this grain structure extends circumferentially in the finished bearing race 10 or 30 and therefore imparts to the bearing race exceptional qualities of wear resistance and load-sustaining which are superior to conventional bearing races not so constructed, but having non-circumferentially disposed grain structures.

I claim:

1. A tapered roller bearing race, comprising
    an annular body of bearing material having an outer peripheral surface and an inner peripheral surface with a roller path on one of said peripheral surfaces,
    said body having a circumferentially disposed grain structure therein, said annular body being composed of a plurality of part-annular segments having the same outer peripheral surface radii and having the same inner peripheral surface radii, each of said segments having flat coplanar opposite ends disposed in a chordal plane, said segments being disposed in end-to-end abutting engagement with layers of fused material disposed between said abutting ends of said segments at the junctions therebetween.

2. A tapered roller bearing race, according to claim 1, wherein each of said segments is semi-annular with its flat opposite ends disposed in a common diametral plane, and wherein the circumferentially disposed grain structure is substantially semicircularly arcuate in each of said segments.

3. A tapered roller bearing race, according to claim 1, wherein said roller path on said one peripheral surface is of substantially frustoconical configuration convergent to the axis of the other peripheral surface.

* * * * *